United States Patent
Venkataraman et al.

(10) Patent No.: US 11,558,771 B2
(45) Date of Patent: Jan. 17, 2023

(54) DEFERRED DOWNLOAD BASED ON NETWORK CONGESTION

(71) Applicant: Apple Inc., Cupertino, CA (US)

(72) Inventors: Vijay Venkataraman, San Jose, CA (US); Lucas H. David, Sunnyvale, CA (US); Kartik R. Venkatraman, Santa Clara, CA (US); Steven R. Brandt, San Jose, CA (US); Sree Ram Kodali, San Jose, CA (US); Rajesh Ambati, Los Altos Hills, CA (US); Srinivasan Nimmala, San Jose, CA (US); Ajay Singh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/884,640

(22) Filed: May 27, 2020

(65) Prior Publication Data

US 2020/0382987 A1 Dec. 3, 2020

Related U.S. Application Data

(60) Provisional application No. 62/855,070, filed on May 31, 2019.

(51) Int. Cl.
*H04W 28/02* (2009.01)
*H04W 48/06* (2009.01)

(52) U.S. Cl.
CPC ... *H04W 28/0273* (2013.01); *H04W 28/0268* (2013.01); *H04W 28/0284* (2013.01); *H04W 48/06* (2013.01)

(58) Field of Classification Search
CPC ..... H04L 47/14; H04L 47/741; H04L 47/743; H04L 28/0268; H04L 28/0273; H04L 28/0284; H04L 48/06; H04W 28/0231
See application file for complete search history.

(56) References Cited

U.S. PATENT DOCUMENTS

| 2008/0285496 | A1* | 11/2008 | Fuchs | ..................... H04L 67/06 370/345 |
| 2013/0124696 | A1* | 5/2013 | Chu | ..................... G06Q 20/102 709/219 |
| 2016/0316388 | A1* | 10/2016 | Rosen | ............... H04W 72/1252 |

FOREIGN PATENT DOCUMENTS

| CN | 104717636 | 6/2015 |
| CN | 105335242 | 2/2016 |
| EP | 3048797 A1 * | 7/2016 |
| GB | 2510073 | 7/2014 |

OTHER PUBLICATIONS

Shi et al., "CoAst: Collaborative Application-Award Scheduling of Last-Mile Cellular Traffic", 14 sheets, Jun. 2014.
(Continued)

*Primary Examiner* — Khoa Huynh
(74) *Attorney, Agent, or Firm* — Fay Kaplun & Marcin, LLP

(57) ABSTRACT

Manners of scheduling downloads for a user equipment (UE). The UE is configured to establish a connection to a network and receive an indication of a user-initiated download, determining whether the download is to be performed now or at a subsequent time, when the download is to be performed at the subsequent time, determine a time window during which the download is to be initiated and initiate the download during the time window.

20 Claims, 5 Drawing Sheets

(56) References Cited

OTHER PUBLICATIONS

Wang et al., "EarlyBird: Mobile Prefetching of Social Network Feeds via Content Preference Mining and Usage Pattern Analysis", 10 sheets, Jun. 2015.
Jung et al., "Network-Congestion-Aware Video Streaming: A Rest-and-Download Approach", 9 sheets, Jun. 2012.

* cited by examiner

DEFERRED DOWNLOAD BASED ON NETWORK CONGESTION

PRIORITY CLAIM/INCORPORATION BY REFERENCE

This application claims priority to U.S. Provisional Application 62/855,070 filed on May 31, 2019 entitled "Deferred Download Based on Network Congestion," the entirety of which is incorporated by reference herein.

BACKGROUND

A user equipment (UE) may establish a connection to at least one of a plurality of different networks or types of networks. When connected, the UE may download data from a remote endpoint. For example, the UE may download a video file from a server via the network connection. During periods of network congestion, for any of a variety of different reasons, the download may stall and take longer than the user may anticipate. Accordingly, network congestion may negatively impact the user experience associated with the UE.

SUMMARY

Some exemplary embodiments are related to a method performed by a user equipment (UE) configured to establish a connection to a network. The method includes receiving an indication of a user-initiated download, determining whether the download is to be performed now or at a subsequent time, when the download is to be performed at the subsequent time, determining a time window during which the download is to be initiated and initiating the download during the time window.

Other exemplary embodiments are related to a user equipment (UE) having a transceiver and a processor. The transceiver is configured to establish a connection to a network. The processor is configured to receive an indication of a user-initiated download, determine whether the download is to be performed now or at a subsequent time, when the download is to be performed at the subsequent time, determine a time window during which the download is to be initiated and initiate the download during the time window.

Still further exemplary embodiments are related to a non-transitory computer readable storage medium comprising a set of instructions. The instructions, when executed by a processor, cause the processor to perform operations. The operations include receiving an indication of a user-initiated download, determining whether the download is to be performed now or at a subsequent time based on at least one of (i) a user input, (ii) a size of the download, or (iii) an indication of network congestion, when the download is to be performed at the subsequent time, determining a time window during which the download is to be initiated based on at least information received from a carrier and initiating the download during the time window.

DETAILED DESCRIPTION

Figure 1:
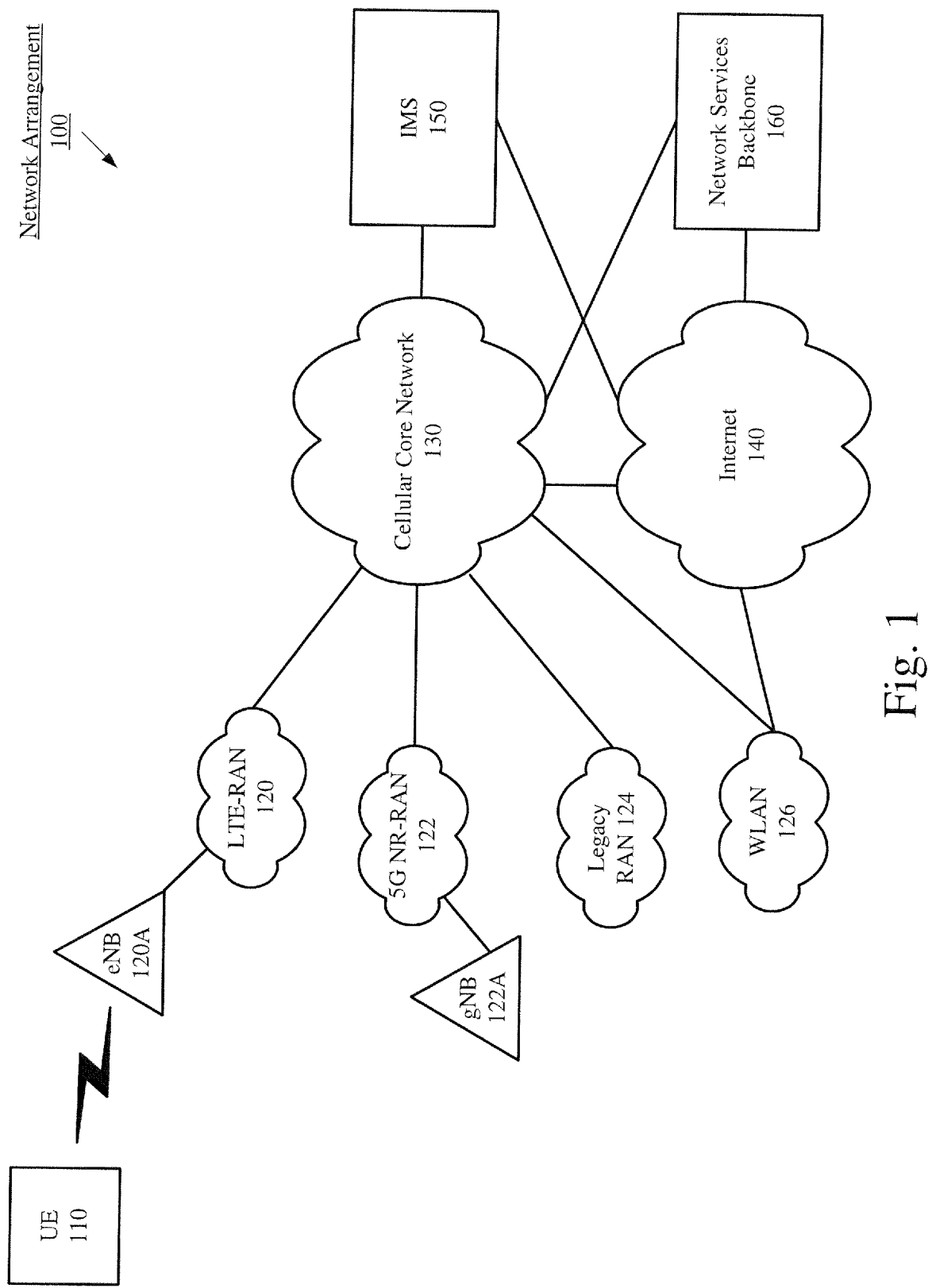
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments describe manners for a user equipment (UE) to improve the user experience associated with downloading data from a remote endpoint via a network connection. The exemplary embodiments avoid the cost associated with downloading data during periods of network congestion while making the desired content available to the user in a convenient manner.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The UE may establish a connection to at least one of multiple of different networks or types of networks. When the network is a cellular network, the UE and the network may communicate via a base station of the corresponding network. In one example, the network may be a Long Term Evolution (LTE) network and the base station may be an Evolved Node B (eNB). In another example, the network may be a 5G new radio (NR) network and the base station may be a next generation Node B (gNB). However, reference to a particular network or a particular type of base station is merely provided for illustrative purposes. Those skilled in the art will understand that the network may be any type of network and the base station may be any type of base station within the corresponding network.

The exemplary embodiments are also described with regard to the UE executing an application that downloads data from a remote endpoint via the network connection. For example, the application may download a video file from a server via the network connection. The video file may then be stored on the UE and available to the user for offline viewing. However, reference to a video file is merely provided for illustrative purposes. The exemplary embodiments may apply to the application downloading any type of data via the network connection.

For any of a variety of different reasons, network congestion may cause a download to stall and take longer than the user may anticipate. Throughout this description, the term network congestion may generally refer to a scenario in which the number of connected UEs and/or the amount of data being exchanged by the network places a strain on the finite hardware, software, firmware and/or radio frequency (RF) resources of the network at a particular coverage area which may result in a degradation of the quality of service associated with the network. Not only are network resources limited during periods of network congestion, the presence of the connected UEs and their corresponding use of the RF spectrum may generate interference and cause signals to collide. Accordingly, the effects of network congestion may negatively impact a wide array of different aspects related to maintaining and utilizing the network connection.

From the user perspective, network congestion is inconvenient because the adverse effects of network congestion may prevent the UE from downloading the data in a reasonable amount of time. For example, during periods of network congestion, the user may have to wait a significant amount of time for the download of a video file to be completed. Thus, the video file may not be available to the user for viewing at the desired time. The adverse effects of network congestion may also cause the UE to experience an increase in the power and/or processing cost of downloading the data via the network connection. However, the UE may be unable to mitigate the adverse effects of network congestion because network congestion is an issue on the network side that is independent from the behavior of the UE.

The exemplary embodiments relate to deferring download(s) to a time period when there is little to no network congestion. Thus, while the UE may be unable to mitigate the adverse effects of network congestion, the UE may avoid the increased power and/or processing cost typically associated with performing certain operations when network congestion exists. For instance, as will be described below, based on the size of the file to download, the user may be given the option to download the data now or to schedule the download to occur during a time window when network congestion is not expected. Once the download is initiated (e.g., now or during the time window), the UE may monitor for indications of network congestion and then adjust the performance of the download based on these indications.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example of the network configuration 100, the networks with which the UE 110 may wirelessly communicate are a LTE radio access network (LTE-RAN) 120, a 5G New Radio (NR) radio access network (5G NR-RAN) 122, a legacy radio access network (RAN) 124 and a wireless local access network (WLAN) 126. However, it should be understood that the UE 110 may also communicate with other types of networks and the UE 110 may also communicate with networks over a wired connection. Therefore, the UE 110 may include a LTE chipset to communicate with the LTE-RAN 120, a 5G NR chipset to communicate with the 5G NR-RAN 122, a legacy chipset to communicate with the legacy RAN 124 and an ISM chipset to communicate with the WLAN 126.

The LTE-RAN 120, the 5G NR-RAN 122 and the legacy RAN 124 may be portions of cellular networks that may be deployed by cellular providers (e.g., Verizon, AT&T, Sprint, T-Mobile, etc.). These networks 120, 122, 124 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The UE 110 may connect to the LTE-RAN 120 via an evolved Node B (eNB) 120A. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific base station (e.g., the eNB 120A of the LTE-RAN 120). As mentioned above, the use of the LTE-RAN 120 is for illustrative purposes and any type of network may be used. For example, the UE 110 may also connect to the 5G NR-RAN 122 via the next generation Node B (gNB) 122A.

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
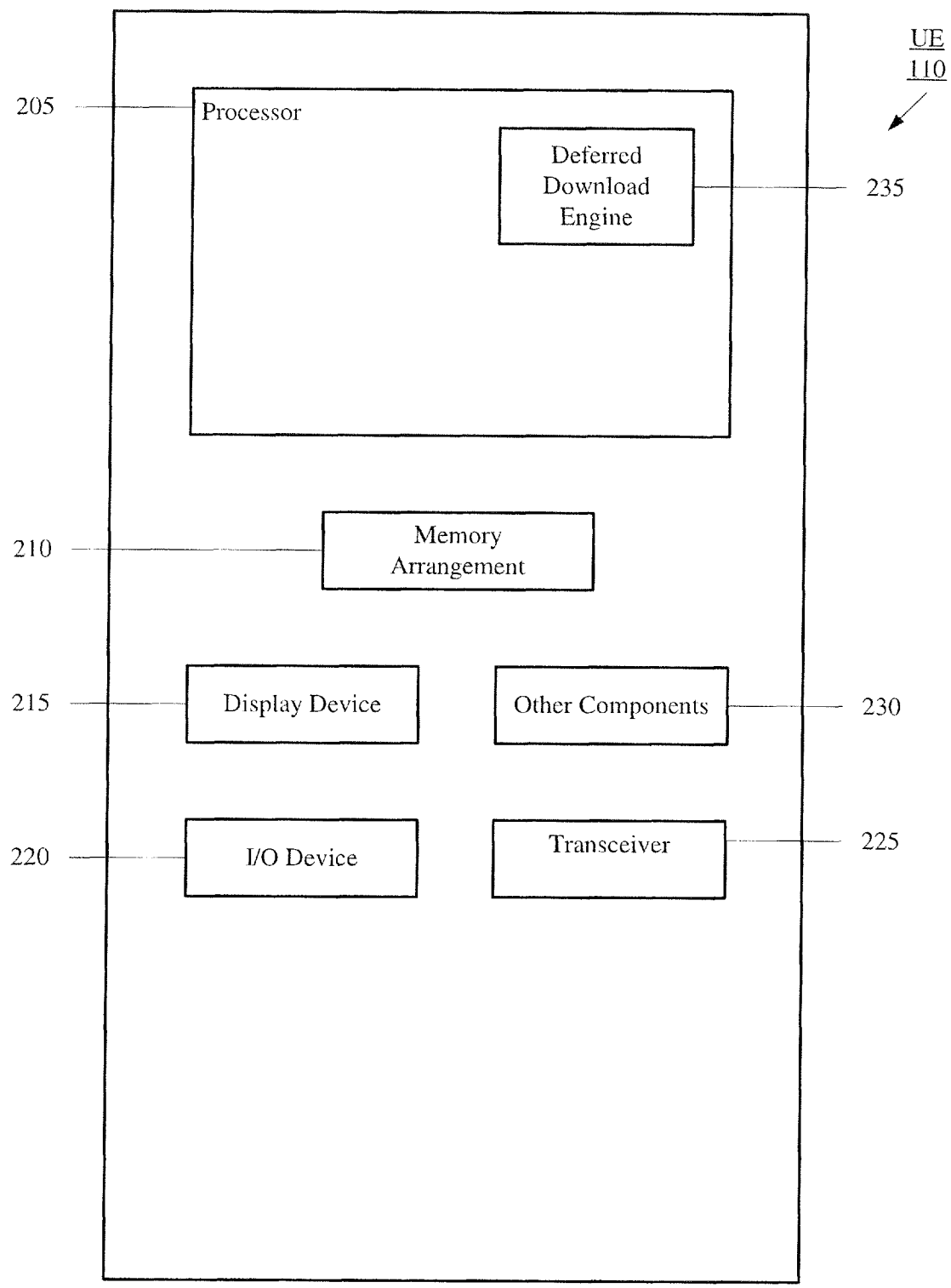
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a deferred download engine 235. The deferred download engine 235 may collect information that indicates when network congestion is present and/or expected to be present. Based on the collected information, the deferred download engine 235 may schedule the download to occur during instances in which network congestion is not present.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the legacy RAN 124, the WLAN 126, etc. Accordingly, the transceiver 225 may operate on a variety of different frequencies or channels (e.g., set of consecutive frequencies).

When connected to the LTE-RAN 120, the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in RRC connected state, the UE 110 and the LTE-RAN 120 may be configured to exchange information and/or data. The exchange of information and/or data may allow the UE 110 to perform functionalities available via the network connection. Further, those skilled in the art will understand that when the UE 110 is connected to the LTE-RAN 120 and in RRC idle state the UE 110 is generally not exchanging data with the network and radio resources are not being assigned to the UE 110 within the network. However, when the UE 110 is in RRC idle state, the UE 110 may monitor for information and/or data transmitted by the network. Those skilled in the art will understand that the RRC idle and connected states are terms associated with an LTE network. Throughout this description these terms are being used generally to describe states the UE 110 may be in when connected to any network and that exhibit the characteristics described above for the RRC idle and RRC connected states.

When the UE 110 is camped on a first cell of a first network in an RRC idle state, the UE 110 may not be able to exchange data with the network. To exchange data with the network the UE 110 may transition from the RRC idle state to the RRC connected state. For example, while in RRC idle state the UE 110 may listen for information such as but not limited to, primary synchronization signals (PSS) and secondary synchronization signals (SSS), Master Information Block (MIB), broadcast messages, System Information Block (SIB), paging messages etc. In response, the UE 110 may issue a request to the network that indicates that the UE 110 wants to be moved to the RRC connected state. A successful transition from the RRC idle state to the RRC connected state may include the exchange of messages between the UE 110 and the first cell of the first network. In the RRC connected state, a network context may be established between the first cell of the first network and the UE 110. Thus, the UE 110 may be assigned radio resources and the UE 110 may be able to exchange data with the network. Transitioning from a RRC connected state to a RRC idle state may be referred to as RRC connection release and transitioning from a RRC idle state to a RRC connected state may be referred to as RRC connection setup or RRC connection reestablishment. However, reference to RRC connection setup, RRC connection reestablishment and RRC connection release is merely provided for illustrative purposes. Other networks may refer to similar operations by different names.

The exemplary embodiments are not limited to RRC connected state and RRC idle state. For example, when the UE 110 is operating within the 5G NR-RAN 122, the UE 110 may be configured to be in an RRC inactive state. In RRC inactive mode, the UE 110 maintains an RRC connection while minimizing signaling and power consumption. As described above, reference to any particular operating state is merely provided for illustrative purposes, the exemplary embodiments may apply to any suitable operating state for the UE 110.

Figure 3:
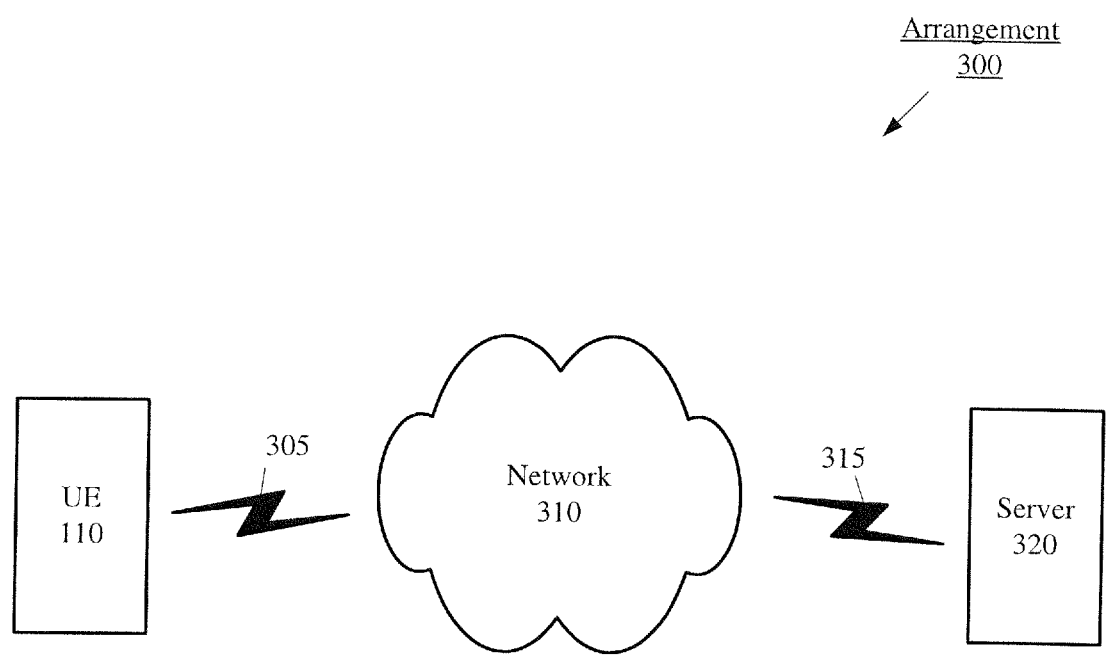
FIG. 3 shows an exemplary arrangement according to various exemplary embodiments.

FIG. 3 shows an exemplary arrangement 300 according to various exemplary embodiments. The exemplary arrangement 300 includes the UE 110, a network 310 and a server 320. As mentioned above, the exemplary embodiments relate to an application being executed by the UE 110 downloading data from a remote endpoint via the network connection. To provide a general example of how an application may download data from the remote endpoint, consider the following exemplary aspects of the UE 110 executing an application that downloads a video file from the server 320 via the network connection 305.

The application and the server may communicate in accordance with an application layer protocol. For example, the application layer protocol may be the hypertext transfer protocol (HTTP). However, reference to HTTP is merely provided for illustrative purposes, there are several variations of HTTP (e.g., HTTP/2, hypertext transfer protocol secure (HTTPS), etc.) and other types of protocols that may be utilized. The exemplary embodiments may apply to the application and the remote endpoint communicating in accordance with any appropriate protocol.

In this example, the server 320 stores a video file that the application being executed by the UE 110 is authorized to access. In accordance with HTTP, the video file may be identified and located within the network by a uniform resource locator (URL). Thus, the application being executed by the UE 110 may access the video file using the corresponding URL.

The server 320 is connected to the network 310 via the network connection 315. The network 310 may be a plurality of interconnected networks. For example, the network 310 may include the network arrangement 100 on the UE 110 side and another network in which the server 320 utilizes to for Internet protocol (IP) connectivity.

The UE 110 is connected to the network 310 via the network connection 305. The application of the UE 110 may be configured with various objects and tasks in accordance with the application's application programming interface (API). The objects and tasks may enable the application to access the server 320 and participate in a data transfer. For example, the application of the UE 110 and the server 320 may establish a URL session. Within the URL session, the application may execute data transfer tasks that enable the application to retrieve the video file.

The rate at which the download progresses is dependent, at least in part, on the network connection 305. Accordingly, during periods of network congestion where the UE 110 may experience no service or limited service via the network connection 305, the download of the video file may stall and take an unreasonable amount of time. This creates a poor user experience and may increase the power and/or processing cost of downloading the data via the network connection 305. The exemplary embodiments relate to performing the download during instances when there is little to no network congestion and thus, the increased cost associated with network congestion may be avoided.

Figure 4:
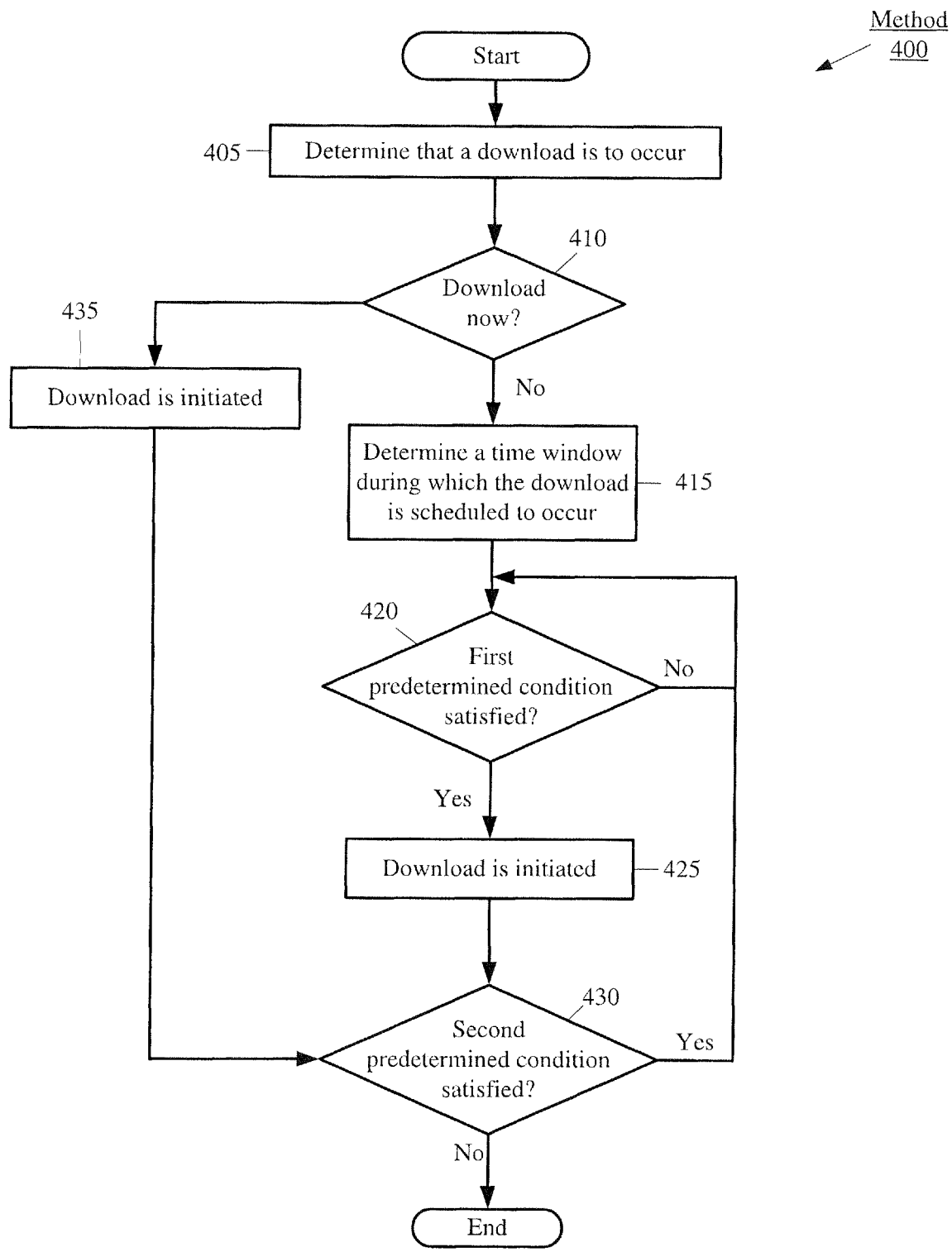
FIG. 4 shows an exemplary method for the UE to defer a download based on network congestion according to various exemplary embodiments.

FIG. 4 shows an exemplary method 400 for the UE 110 to defer a download based on network congestion according to various exemplary embodiments. The method 400 will be described with regard to the network arrangement 100 of FIG. 1 and the UE 110 of FIG. 2.

In 405, the application determines that a download is to occur. For example, user input may indicate to the application that a video file has been selected by the user to be downloaded and stored locally for offline viewing. However, reference to the video file is merely for illustrative purposes. During operation, the application may be configured to download a wide variety of different types of data from the remote endpoint including, but not limited to, background data, configuration information, software updates, multimedia data (e.g., audio, video, etc.), discretionary data, advertisements, etc. The download of some types of data may be triggered based on other factors including, but not limited to, a schedule, a periodic basis, a predetermined condition, a type of event, etc. The exemplary embodiments may apply to the download of any type of data being triggered for any appropriate reason.

In 410, the UE 110 determines whether the download is to be performed now or if the download is to be performed at a subsequent time. If the download is to be performed at the subsequent time the method 400 continues to 415 and if the download is to be performed now the method 400 continues to 435.

As will be described below, the determination in 410 may be based on any one or more of multiple different factors. However, the exemplary embodiments are not limited to making this determination based on any particular set of criteria. In one aspect, this feature provides the user with the convenience of being able browse the content the application has to offer (e.g., video files, audio files, etc.) at a first time when the user does not intend to play the content and then have the content be available at a subsequent time when the user does intend to play the content. In another aspect, this feature allows the UE 110 to avoid the increased cost associated with performing the download during periods of network congestion. Accordingly, this determination may be made based on any appropriate criteria related to either user convenience and/or UE 110 efficiency.

In some exemplary embodiments the determination in 410 may be made in response to user input. In one example, the user may be prompted with a notification/alert that requests the user to select between the two options. In another example, the user input may be the same user input from 405 (e.g., user selects a link that states "download tonight" in 405).

In other exemplary embodiments, the determination in 410 may be based on the amount of data to be downloaded. As the amount of data to be downloaded increases, the duration of the download increases along with the power and/or processing cost. Accordingly, the larger the download the more difficult the download may be to complete during periods of network congestion. Accordingly, the UE 110 may be configured to download files over a predetermined size (e.g., 300 megabytes (MB), 500 MB, 700 MB, etc.) during a particular time window, or when network conditions are less congested. Thus, if a download is to occur that is over the predetermined size and it is not currently within the designated time window, the method 400 may continue to 415 where the time window during which the download is scheduled to occur will be determined. The amount of data to be downloaded may also be a consideration because the user's cellular plan may limit the UE 110 to a certain amount of data per day, per month, etc. Further, whether the UE 110 is connected to a home network or another operator's network (e.g., roaming) may also be a consideration because the data budget associated with the UE 110 may be different when roaming. Thus, downloads of a certain size may be deferred to prevent the UE 110 from utilizing an excessive amount of the data budget early in the day/month because it may prevent other data transfers from being performed.

In some exemplary embodiments, the determination in 410 may be based on whether an indication of network congestion is identified at the baseband processor. If an indication of network congestion is identified the download may be deferred to a subsequent time. As mentioned above, the effects of network congestion may negatively impact a wide array of different aspects related to maintaining and utilizing the network connection. When network conditions indicative of these effects are identified at the baseband processor, this may indicate to the UE 110 that network congestion is present. For example, the reception of a plurality of consecutive RRC connection rejections (e.g., 2, 4, 6, 7, etc.) from a base station may provide an indication of network congestion. Similarly, in response to an attempt to establish access to non-access stratum (NAS) services, a NAS service rejection may provide an indication of network congestion. Another indication of network congestion may be receiving a plurality of downlink grants that are small in size relative to the buffer status report (BSR). Other indications of network congestion may include, but are not limited to, low throughput, low signal-to-interference-to-noise ratio (SINR), a plurality of radio link control (RLC) retransmissions, inter grant arrival time, a plurality of hybrid automatic repeat request (HARQ) retransmissions, high transmit power, poor reference signal received power (RSRP), the amount of time a base station is barred/blacklisted, etc. Accordingly, the UE 110 may consider any of a variety of link quality metrics and radio frequency (RF) conditions to determine whether the download is to occur now or at a subsequent time. However, any reference to a particular indication is merely for illustrative purposes, the exemplary embodiments may apply to any appropriate indication of network congestion identified at the baseband processor.

In 415, the UE 110 determines a time window during which the download is scheduled to occur. As will be described below, the time window may be based on any of a plurality of different factors. However, the exemplary embodiments are not limited to making this determination based on any particular set of criteria and may be made using any appropriate basis.

In one exemplary embodiment, the UE 110 may schedule the download to occur at night (e.g., 8 p.m.-8 a.m.). Since network congestion correlates to a number of connected UEs and/or an amount of data being exchanged, the presence of network congestion may follow the cyclical pattern of human activity within the region. For example, typically there are more active UEs utilizing cellular based services during the day as opposed the night because there are usually more people using their UEs during the day. Accordingly, network congestion may be more likely during the day and thus, the download may be deferred to the night to avoid instances during which network congestion is more likely.

In another exemplary embodiment, the user may select the time window when the download is to occur. In one aspect, the exemplary embodiments are intended to provide the user with a convenient solution to the inconvenient problem of slow downloads due to network congestion. Thus, the user may set the time window to begin at any time and be any length that is convenient for the user. For example, the user may not use the UE 110 during the day but typically spend a substantial amount of time performing voice calls during the evening. Thus, the user may set the time window to time periods during which the user does not intend to use the UE 110 so that the download does not interfere with the performance of other operations. Similarly, the UE 110 (e.g., the deferred download engine 235) may analyze daily data usage patterns and schedule the time window based on the data usage patterns to avoid interfering with the activity of the user.

In other exemplary embodiments, the time window may be based on information received from a network entity (e.g., a server) associated with the carrier. For example, the carrier may determine when and where network congestion exists. The carrier may then provide the UE 110 with an indication of a time window that would be preferred for the UE 110 to perform the download via the network connection in an efficient manner. In still further exemplary embodiments, the time window may be based on information received from a third party entity. For example, the manufacturer of the UE may collect information for multiple UEs in a certain geographical area (e.g., crowdsourced information) and from the crowdsourced information may determine that the network to which the UE is attached is experiencing congestion and may determine the time window(s) where there is less congestion. This information may then be sent to the UE 110.

Other factors may relate to the provider of the application. For example, at certain times, the remote endpoint may be offline, the desired content may not be available, and/or the monetary price to download the content may be increased. Conversely, at certain times, the use of an application may be associated with a monetary price at a first time and a different monetary price at a second time. Accordingly, the download may be scheduled based on availability and/or monetary price of the desired content.

In 420, the UE 110 determines whether a first predetermined condition is satisfied during the time window. The first predetermined condition may indicate to the UE 110 that the download may be initiated. Accordingly, if the first predetermined condition in 420 is satisfied the method 400 continues to 425 where the download is initiated. If the first predetermined condition is not satisfied the method 400 returns to 420 where the UE 110 continues to monitor for the first predetermined condition. As will be described below, the first predetermined condition may be based on any one or more of multiple different factors. However, the exemplary embodiments are not limited to making this determination based on any particular set of criteria and may be made on any appropriate basis.

There may be substantial overlap between the factors considered in 410 and the factors considered in 420. The determinations made in 410 and 420 are both generally directed at the same scenario (e.g., download now or at a subsequent time) and are both intended to provide convenience to the user while avoiding the inefficient use of power and/or processing resources during periods of network congestion. Accordingly, the determinations in 410 and 420 may be based on similar factors.

For example, one exemplary factor may be whether an indication of network congestion is identified at the baseband processor. Examples of types of indications of network congestion that may be identified at the baseband processor were described above with regard to 410. Accordingly, the first predetermined condition may include any of a plurality of different link quality metrics and/or RF conditions that may indicate to the UE 110 that the quality of the network connection is adequate for the download to occur in an efficient manner.

Another exemplary factor may be information received from the carrier. For example, the UE 110 may receive an indication from a network entity via the network connection that indicates to the UE 110 that the portion of the network relevant to the UE 110 is currently not experiencing network congestion and thus, the download may be initiated. Other factors may include, but are not limited to, percentage of data budget available, a WiFi connection, a predetermined amount of time during which the UE 110 has been inactive (e.g., 10 minutes, 15 minutes, 30 minutes, 1 hour, etc.), whether an alarm is set to go off within a predetermined amount of time, battery life, whether the UE 110 is plugged in, thermal pressure, memory availability, CPU usage, etc.

In 425, the download is initiated. Accordingly, the application may establish a URL session and begin executing data transfer tasks.

In 430, the UE 110 determines whether a second predetermined condition is satisfied. The second predetermined condition may indicate to the UE 110 that network congestion is present and thus, the download should be paused or cancelled. The determination in 410, 420 and 430 may be based on similar factors.

For example, while the download progresses, the UE 110 may monitor for various link quality metrics that provide an indication of network congestion. If the link quality metric(s) indicate that the download may not progress at a desired speed (e.g., connection issue, limited service, no service, high congestion), the method 400 may return to 420 and the UE 110 may monitor for the first predetermined condition to determine when to resume or re-initiate the download. In some exemplary embodiments, when the download is paused or cancelled, the UE 110 may monitor for a particular condition that indicates that the particular connection issue or cause of limited/no service has been resolved. For example, the UE 110 may monitor for a successful RRC connection after a plurality of consecutive RRC connection rejections or releases or may monitor for a particular link quality metric to improve by a predetermined amount. In other exemplary embodiments, the UE 110 may implement a guard timer before resuming or reinitiating the download.

Returning to 430, if the second predetermined condition is not satisfied, the download may complete and the method 400 may end. Accordingly, in this example, the video file may now be available for offline viewing.

Returning to 410, if it is determined that the download is to be performed now the method 400 continues to 435. In 435, the download is initiated. Accordingly, the application may establish a URL session and begin executing data transfer tasks. Once the download is initiated in 435, the method 400 may advance to 430 where it is determined whether the second predetermined condition is satisfied. As mentioned above, the second predetermined condition may indicate to the UE 110 that network congestion is present and thus, the download should be paused or cancelled. Thus, when the second predetermined condition is satisfied, the download may be paused or cancelled and the method 400 may return to 410. If the second predetermined condition is not satisfied, the download may complete and the method 400 may end.

Figure 5:
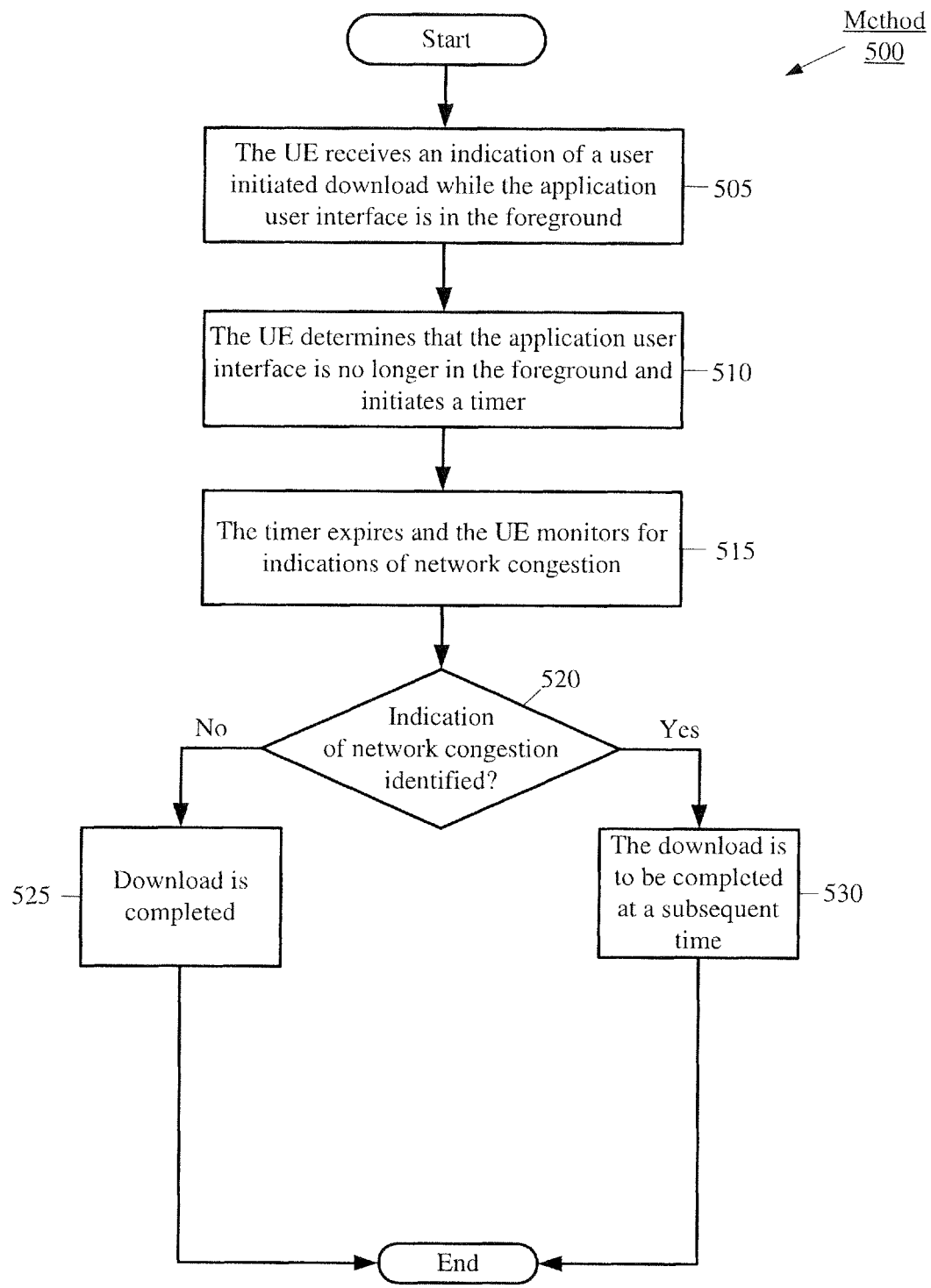
FIG. 5 shows an exemplary method for the UE to defer a download based on network congestion according to various exemplary embodiments.

FIG. 5 shows an exemplary method 500 for the UE 110 to defer a download based on network congestion according to various exemplary embodiments. The method 500 will be described with regard to the network arrangement 100 of FIG. 1, the UE 110 of FIG. 2 and the method 400 of the FIG. 4.

In 505, the UE 110 receives an indication of a user-initiated download while the application user interface is in the foreground. When the application user interface is in the foreground (e.g., currently displayed), this may indicate that the user wants the desired content to be available as soon as possible. Accordingly, regardless of the presence of network congestion, while the application user interface is in the foreground the UE 110 may attempt to download the data from the remote endpoint via the network connection.

Compared to the method 400, the method 500 may involve less direct and explicit user input. For example, in 410 of the method 400, the user may affirmatively select whether the downloaded is to be performed now or is to be scheduled to be performed at a subsequent time. In the method 500, these determinations may be made based on whether the application user interface is in the foreground.

In 510, the UE 110 determines that the application user interface is no longer in the foreground and initiates a timer. For example, another application user interface may now be in the foreground, the home screen may be displayed, the lock screen may be displayed, a screen saver may be displayed, or the display may be off.

The timer may be set to any appropriate predetermined duration (e.g., 10 second, 20 seconds, 30 seconds, 1 minute, etc.). During the duration of the timer, the UE 110 may continue to attempt to download the data from the remote endpoint via the network connection. If the application user interface is brought back to the foreground before the expiration of the timer, the timer may be reset. Further, if the download completes before the timer expired, the desired content is available and thus, the method 500 ends.

In 515, the timer expires and the UE 110 monitors for indications of network congestion. Here, the indications of network congestion may be similar to the indications discussed above with regard to 410, 420 and 430. For example, indications of network congestion that may be identified at the baseband processor. The UE 110 may monitor for any of multiple different link quality metrics and/or RF conditions that may indicate to the UE 110 that the quality of the network connection is sufficient for the download to continue in an efficient manner.

In 520, the UE 110 determines whether an indication of network congestion has been identified. If no indication of network congestion is identified, the method 500 continues to 525 where the download is completed. If an indication of network congestion is identified, the download may be paused/cancelled and the method 500 continues to 530.

In 530, the download is to be completed at a later time. For example, in one exemplary embodiment and similar to 415 of the method 400, the UE 110 may determine a time window during which the download is scheduled to occur. Once scheduled, 420-430 may be performed.

In another exemplary embodiment and similar to 420 of the method 400, the UE 110 may monitor for a predetermined condition that indicates to the UE 110 that the download may be performed in a convenient and/or efficient manner. If the predetermined condition is satisfied, the download may resume or be re-initiated (e.g., 425-430 may be performed).

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

As described above, one aspect of the present technology is the gathering and use of data available from specific and legitimate sources to improve the user experience associated with downloading data via the network connection. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information can be used to defer the performance of a download to a subsequent time and/or determine a time window during which the download is scheduled to occur.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the performance of a download may be deferred to a subsequent time and/or determine a time window during which the download is scheduled to occur based on aggregated non-personal information fata or a bare minimum amount of personal information, such as the content being handled only on the user's device and not provided to the entity operating the application and/or the remote endpoint.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) configured to establish a connection to a network:
   receiving an indication of a user-initiated download;
   determining whether the download is to be performed now or at a subsequent time based at least on an analysis of usage patterns of an individual user;
   when the download is to be performed at the subsequent time, determining a time window during which the download is to be initiated, wherein determining whether the download is to be performed now or at a subsequent time is based on at least whether a corresponding application user interface is in a foreground;
   initiating a timer when the application user interface is removed from the foreground, wherein the timer is set to a predetermined duration and the download is initiated during the duration of the timer;
   when the timer expires, monitoring for an indication of network congestion while the download continues to be performed; and
   initiating the download during the time window.

2. The method of claim 1, wherein determining whether the download is to be performed now or at a subsequent time is further based on at least one of (i) a user input, (ii) a size of the download, or (iii) an indication of network congestion.

3. The method of claim 2, wherein the indication of network congestion is based on at least one of link quality metrics, radio frequency (RF) conditions of a network connection or reception of multiple rejection messages from the network as determined by a baseband processor of the UE.

4. The method of claim 1, wherein the time window is based on information received from one of a carrier or a third party.

5. The method of claim 4, wherein the information received from the carrier or the third party indicates one of (i) when network congestion is unlikely, or (ii) a first price associated with a use of an application at a first time and a second price associated with the use of the application at a second time.

6. The method of claim 1, wherein the time window is based on at least one of (i) a user input, (ii) a preconfigured schedule in the UE, (iii) usage information collected by the UE, or (iv) information received from a provider of an application requesting the download.

7. The method of claim 1, wherein initiating the download during the time window is based on at least (i) an indication of network congestion determined by the UE or (ii) information received from a carrier.

8. The method of claim 1, further comprising:
   determining, while the download is occurring, whether a network congestion condition has occurred;
   when the network congestion condition has occurred, pausing the download; and
   rescheduling the download for a later time.

9. The method of claim 8, wherein the pausing the download comprises one of deleting a portion of the download already completed or storing the portion of the download already completed.

10. A user equipment (UE), comprising:
    a transceiver configured to establish a connection to a network; and
    a processor configured to:
    receive an indication of a user-initiated download;
    determine whether the download is to be performed now or at a subsequent time based at least on an analysis of usage patterns of an individual user;
    when the download is to be performed at the subsequent time, determine a time window during which the download is to be initiated, wherein determining whether the download is to be performed now or at a subsequent time is based on at least whether a corresponding application user interface is in a foreground;

initiating a timer when the application user interface is removed from the foreground, wherein the timer is set to a predetermined duration and the download is initiated during the duration of the timer;

when the timer expires, monitoring for an indication of network congestion while the download continues to be performed; and initiate the download during the time window.

11. The UE of claim 10, wherein determining whether the download is to be performed now or at a subsequent time is further based on at least one of (i) a user input, (ii) a size of the download, (iii) an indication of network congestion, wherein the indication of network congestion is based on at least one of link quality metrics or radio frequency (RF) conditions of a network connection or (iv) reception of multiple rejection messages from the network as determined by the processor of the UE.

12. The UE of claim 10, wherein the time window is based on information received from one of a carrier or a third party, wherein the information received from the carrier or third party indicates one of (i) when network congestion is unlikely, or (ii) a first price associated with a use of an application at a first time and a second price associated with the use of the application at a second time.

13. The UE of claim 10, wherein the time window is based on at least one of (i) a user input, (ii) a preconfigured schedule in the UE, (iii) usage information collected by the UE, or (iv) information received from a provider of an application requesting the download.

14. The UE of claim 10, wherein initiating the download during the time window is based on at least (i) an indication of network congestion determined by the UE or (ii) information received from a carrier.

15. The UE of claim 10, wherein the processor is further configured to:

determine, while the download is occurring, whether a network congestion condition has occurred;

when the network congestion condition has occurred, pause the download; and reschedule the download for a later time.

16. A non-transitory computer readable storage medium comprising a set of instructions that when executed by a processor cause the processor to perform operations comprising:

receiving an indication of a user-initiated download;

determining whether the download is to be performed now or at a subsequent time based on at least an analysis of usage patterns of an individual user;

when the download is to be performed at the subsequent time, determining a time window during which the download is to be initiated based on at least information received from a carrier, wherein determining whether the download is to be performed now or at a subsequent time is based on at least whether a corresponding application user interface is in a foreground;

initiating a timer when the application user interface is removed from the foreground, wherein the timer is set to a predetermined duration and the download is initiated during the duration of the timer;

when the timer expires, monitoring for an indication of network congestion while the download continues to be performed; and initiating the download during the time window.

17. The non-transitory computer readable storage medium of claim 16, wherein determining whether the download is to be performed now or at the subsequent time is further based on at least one of (i) a user input, (ii) a size of the download, or (iii) an indication of network congestion.

18. The non-transitory computer readable storage medium of claim 17, wherein the indication of network congestion is based on at least one of link quality metrics, radio frequency (RF) conditions of a network connection or reception of multiple rejection messages from the network as determined by a baseband processor of the UE.

19. The non-transitory computer readable storage medium of claim 16, wherein the time window is based on information received from one of a carrier or a third party, wherein the information received from the carrier or the third party indicates one of (i) when network congestion is unlikely, or (ii) a first price associated with a use of an application at a first time and a second price associated with the use of the application at a second time.

20. The non-transitory computer readable storage medium of claim 16, wherein the time window is based on at least one of (i) a user input, (ii) a preconfigured schedule in the UE, (iii) usage information collected by the UE, or (iv) information received from a provider of an application requesting the download.

* * * * *